(12) United States Patent
Hamada (10) Patent No.: US 7,555,624 B2
(45) Date of Patent: Jun. 30, 2009

(54) PROGRAM, AN APPARATUS AND A METHOD FOR GUARANTEEING A DATA STORAGE ORDER IN AN ISAM FILE

(75) Inventor: Yukihiro Hamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 257 days.

(21) Appl. No.: 11/075,095

(22) Filed: Mar. 8, 2005

(65) Prior Publication Data
US 2005/0154844 A1    Jul. 14, 2005

Related U.S. Application Data

(63) Continuation of application No. PCT/JP03/02348, filed on Feb. 28, 2003.

(51) Int. Cl.
*G06F 12/00* (2006.01)

(52) U.S. Cl. .................. 711/165; 711/154; 711/161; 711/162; 711/170; 711/171

(58) Field of Classification Search .................. None
See application file for complete search history.

(56) References Cited

U.S. PATENT DOCUMENTS 4,408,273 A * 10/1983 Plow .......................... 707/202
5,628,016 A * 5/1997 Kukol ......................... 717/140
6,038,636 A * 3/2000 Brown, III et al. .......... 711/103
6,397,311 B1 * 5/2002 Capps ......................... 711/165

FOREIGN PATENT DOCUMENTS

| JP | 63-257849 | 10/1988 |
| JP | 63-292251 | 11/1988 |
| JP | A 4-134541 | 5/1992 |
| JP | 4-310143 | 11/1992 |
| JP | A 4-354036 | 12/1992 |

* cited by examiner

*Primary Examiner*—Reginald G Bragdon
*Assistant Examiner*—Shawn X Gu
(74) *Attorney, Agent, or Firm*—Greer, Burns & Crain, Ltd.

(57) ABSTRACT

When a data storage request is issued, data is stored at an address indicated by a pointer that indicates the start of a free area, and when a data fetch request is issued, data is fetched from a data storage area indicated by an oldest index. Moreover, when a condense request is issued, after temporarily saving data from the data storage area to a save area, the saved data is restored to a contiguous area starting from an address indicated by a pointer which indicates the start of the free area, and the pointer which indicates the start of the free area is advanced by an amount equivalent to the size of the data storage area required to restore the data. Therefore even during the condense processing, data can be stored in the address indicated by the pointer indicating the start of the free area.

12 Claims, 8 Drawing Sheets

PROGRAM, AN APPARATUS AND A METHOD FOR GUARANTEEING A DATA STORAGE ORDER IN AN ISAM FILE

This application is a continuation of PCT/JP03/02348, filed on Feb. 28, 2003.

BACKGROUND OF THE INVENTION

1. Field of the Invention

The present invention relates to an asynchronous communication technique, and in particular to an asynchronous communication technique which enables condense processing to be performed while an application is running.

2. Description of the Related Art

Efficient data communication is possible with asynchronous communication because processing is complete once the data is sent, regardless of the state of the destination application. Consequently, in core business systems that perform asynchronous communication, logical queues which store data such as service requests are provided for each application.

As these queues, ISAM (Indexed Sequential Access Method) files are used, which can store data in the order in which it was received, and also fetch data in the order in which it was stored, by using indices which indicate the storage address of each piece of data. Moreover, by using the ISAM files cyclically using pointers which indicate the start and end of free areas, the storage and fetch of data to and from a buffer is rendered unnecessary, and data can be accessed at high speed. That is to say, when storing data using a pointer indicating the start of a free area, and fetching data from the end of the free area, high speed access is realized by updating the pointer.

However, if an error occurs with the application, and data is not fetched from the ISAM file, there is a danger that the pointer indicating the end of the free area may not be updated. If the pointer indicating the end of the free area is not updated, a so called "fragmented" state results, which means that the free area cannot be used despite being available, and this decreases the free area. Consequently, "condense processing" is appropriately performed in which the data in the ISAM file is temporarily saved and then restored to a contiguous area, thereby increasing the free area.

However, if data is stored during the condense processing, the saved data is restored after the stored data, making it impossible to guarantee the storage order of the data. Consequently, as shown in Patent Document 1, it is necessary to use a flag to determine whether or not storage is possible, and thus prevent the storage of data during the condense processing. Because the prevention of data storage involves a suspension of service by the application, the result is a reduction of service.

Therefore, in consideration of the above heretofore problems, it is an object of the present invention to provide an asynchronous communication technique capable of condense processing ISAM files even when applications are running, by devising a method of restoring the saved data.

Patent Document 1 corresponds to:

Japanese Kokai (Unexamined Patent Publication) No. 63-257849

DISCLOSURE OF THE INVENTION

In an asynchronous communication technique according to the present invention, in asynchronous communication in which data is stored and fetched directly while data storage areas are used cyclically using pointers which indicate the start and end of free areas, and in which an ISAM file in which the data storage order is guaranteed by an index which indicates the data storage addresses, is used as a queue, when a data storage request is issued, data is stored at an address indicated by a pointer which indicates the start of the free area, and then the pointer which indicates the start of the free area is updated. Furthermore, when a data fetch request is issued, data is fetched from a data storage address indicated by an oldest index, the index is then deleted, and a pointer which indicates the end of the free area is updated as necessary. In addition, when a condense request is issued, after temporarily saving data from the data storage area to a save area, the saved data is restored to a contiguous area starting from an address indicated by a pointer which indicates the start of the free area, and the pointer which indicates the start of the free area is advanced by an amount equivalent to the size of the data storage area required to restore the saved data.

According to this configuration, when a data storage request is issued, data can be stored directly to the address indicated by the pointer, which indicates the start of the free area. Furthermore, when a data fetch request is issued, data can be fetched directly from the data storage address indicated by the oldest index. By then updating the pointer which indicates the start of the free area, and also as necessary updating the pointer which indicates the end of the free area, it is possible to store or fetch data at high speed without going through a buffer.

When a request for condense processing is issued, after temporarily saving the data from the data storage area to a save area, the saved data is restored to a contiguous area starting from the address indicated by the pointer which indicates the start of the free area. Furthermore, the pointer that indicates the start of the free area is advanced by an amount equivalent to the size of the data storage area required to restore the saved data. Therefore, if a data storage request is issued during the condense processing, data is stored in the area which follows the area for restore. Consequently, data storage is possible even during the condense processing, and for example 24-hour operation of core business systems which use asynchronous communication is possible.

Here, it is desirable that the size of the data storage area required to restore the data is calculated when the data is saved temporarily to the save area from the data storage area. In this manner, when data is saved, because the size of the data is already known of itself, the size of the data storage area required for restoration can be calculated simply by adding up the sizes one by one.

Furthermore, when deleting an index, if the index indicates an address, which follows the end of the free area, it is preferable that the pointer which indicates the end of the free area is updated. At this time, the pointer that indicates the end of the free area is preferably advanced to a point immediately before the nearest area which is in use. In this manner, the free area can be increased.

BEST MODE FOR CARRYING OUT THE INVENTION

The present invention is described in detail below, with reference to the appended drawings.

Figure 1:
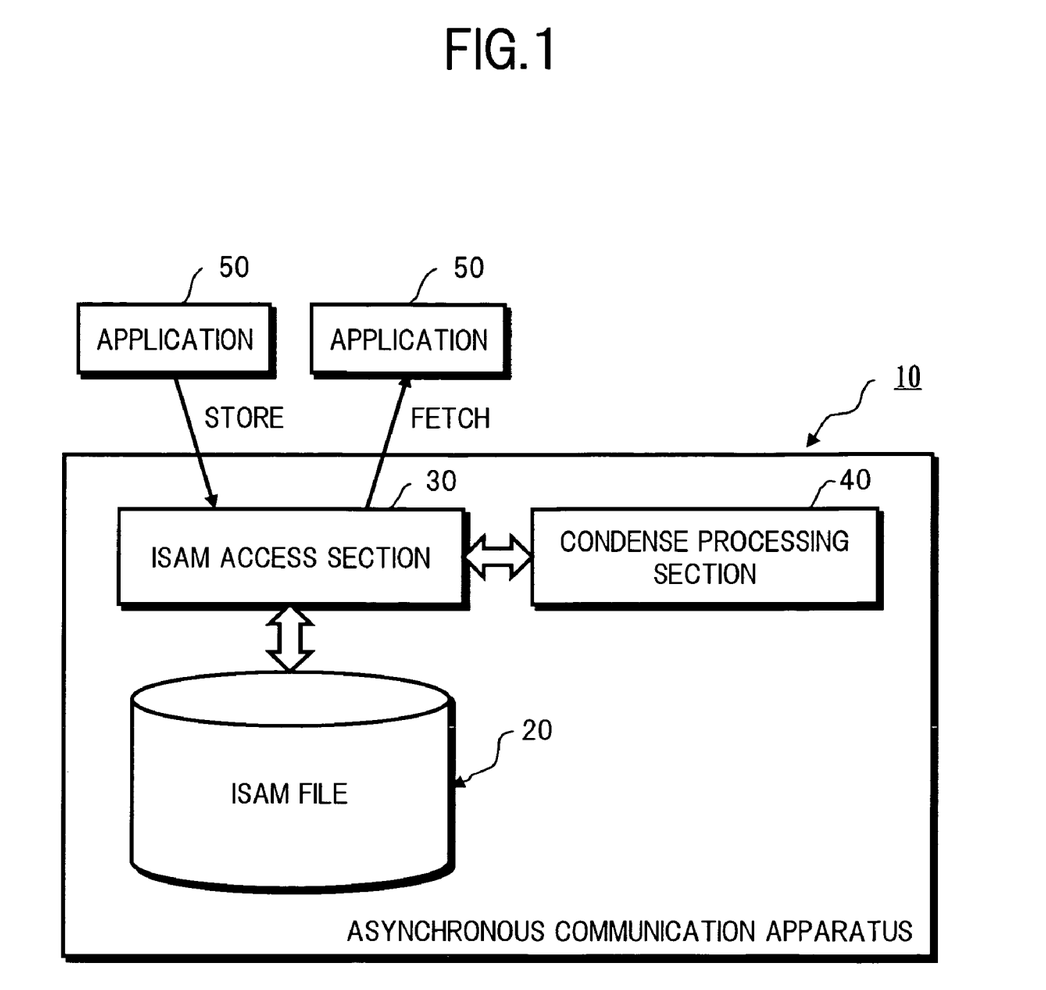
FIG. 1 is an overall configuration diagram of an asynchronous communication apparatus according to the present invention.

FIG. 1 shows an overall configuration of an asynchronous communication apparatus according to the present invention, built using a computer comprising at least a central processing unit and a memory. The asynchronous communication apparatus 10 operates by means of a program loaded into the memory, and comprises an ISAM file 20, an ISAM access section 30, and a condense processing section 40.

Figure 2:
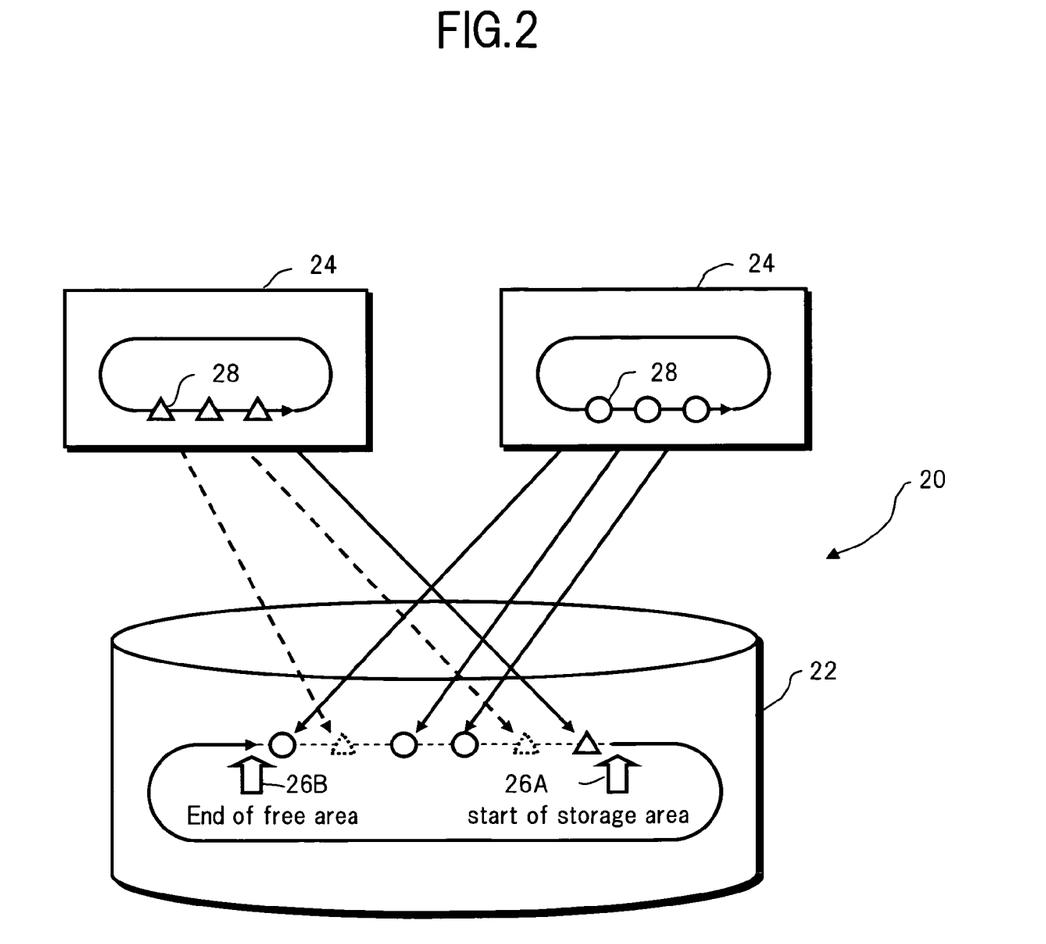
FIG. 2 is an explanatory view of an ISAM file.

As shown in FIG. 2, the ISAM file 20 comprises a data storage section 22 shared by all applications which perform asynchronous communication, and an exclusive index section 24 for each application addressed by asynchronous communication. In the data storage section 22, data such as service requests is stored and fetched at high speed using a storage area start pointer 26A which indicates the start of the data storage area and an end pointer 26B which indicates the end of the free area. That is to say, when storing data, the data is written directly to the address indicated by the storage area start pointer 26A, and when data is fetched from the address indicated by the end pointer 26B, the end pointer 26B is updated. Furthermore, by using the data storage area in a cyclical manner, the input and output of data to and from a buffer is no longer necessary, and high speed access can be realized. Furthermore, in order to guarantee the storage order of data, indices 28 which indicate the data storage addresses are managed in the index sections 24 in the order in which the data is received.

In the ISAM access section 30, when a data storage request or data fetch request is issued from an application 50 via an API (Application Program Interface), data storage processing or data fetch processing as described below is performed, respectively. On the other hand, in the condense processing section 40, if a condense request is issued from, for example, a console (not shown), the condense processing as described below is executed in cooperation with the ISAM access section 30.

Figure 3:
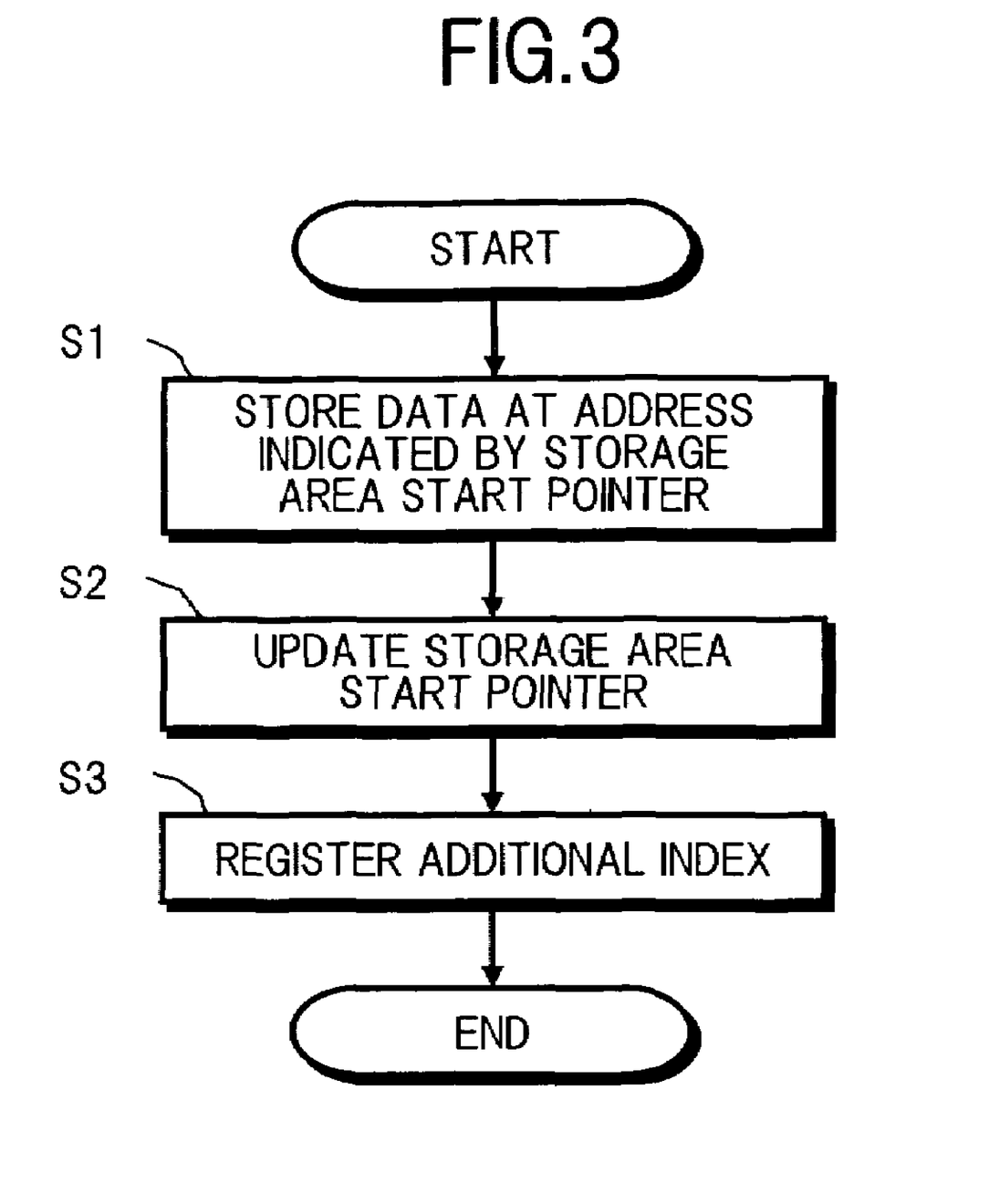
FIG. 3 is a flowchart showing data storage processing.

FIG. 3 shows the data storage processing executed in the ISAM access section 30. The data storage processing in this figure respectively realizes; a data storage function, a data storage device, and a data storage step.

In step 1 (abbreviated to S1 in the figure, and similarly thereafter), data is stored at the address indicated by the storage area start pointer 26A.

In step 2, the storage area start pointer 26A is updated. That is to say, when data is stored in the ISAM file 20, because the size of the data is already known, the storage area start pointer 26A is advanced by an equivalent amount, and thus updated.

In step 3, one relevant index section 24 of the ISAM file 20 is updated. That is to say, an additional index 28 that indicates the address where the data was stored is registered in such relevant index section 24.

According to this processing, when data is stored in the ISAM file 20, the data can be stored at high speed by storing data directly in the address indicated by the storage area start pointer 26A, without going through a buffer. At this time, because the address where the data is actually stored is managed by the index 28, even if as shown in FIG. 2 the data of each application is not stored in a contiguous manner in the data storage section 22, this does not cause an error. Here, the triangles shown as broken lines in FIG. 2 indicate data which has already been fetched.

Figure 4:
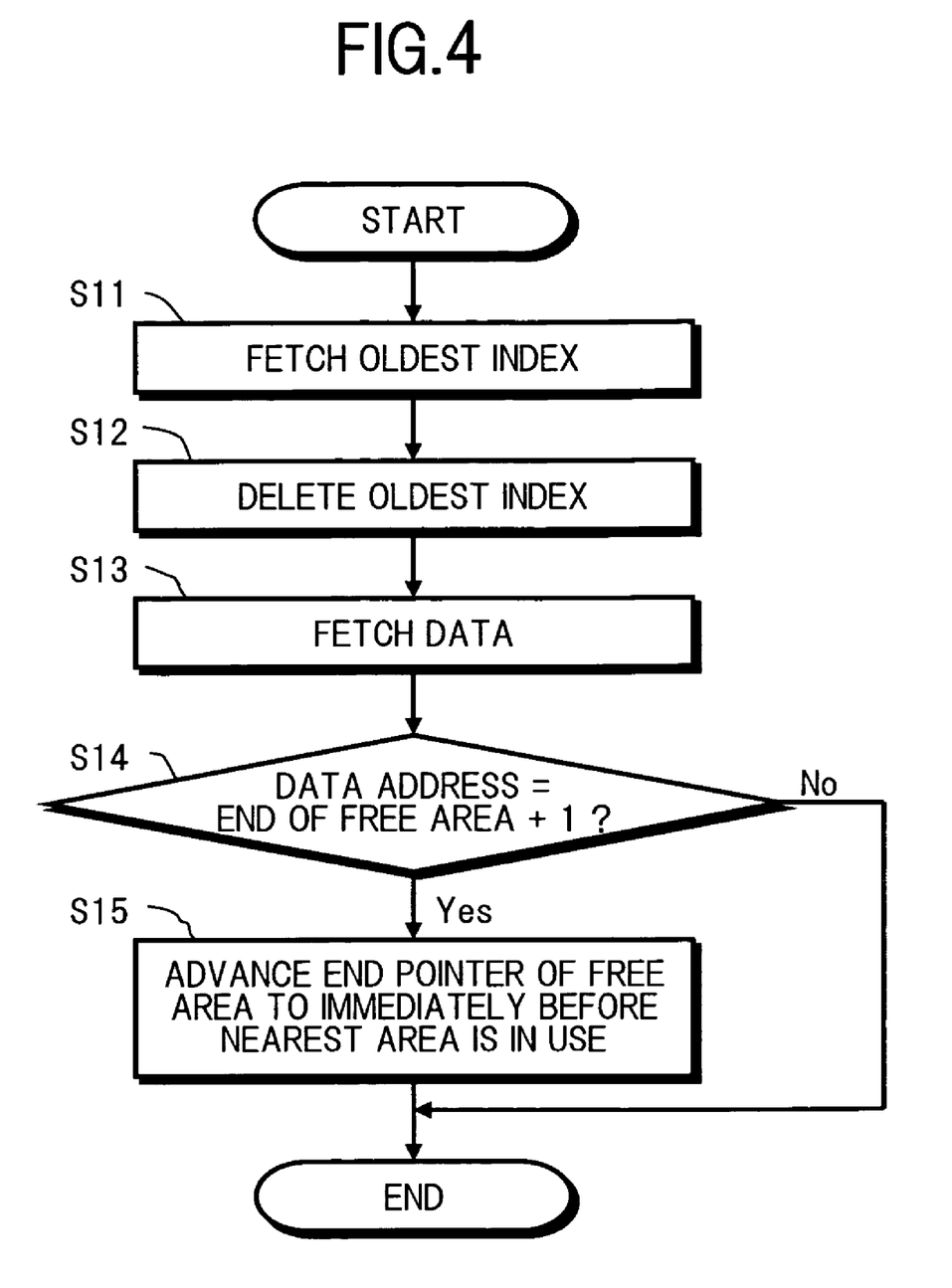
FIG. 4 is a flowchart showing data fetch processing.

FIG. 4 shows the data fetch processing executed in the ISAM access section 30. The data fetch processing in this figure respectively realizes; a data fetch function, a data fetch device, and a data fetch step.

In step 11, one oldest index is fetched from the index sections 24 of the ISAM file 20.

In step 12, this oldest index is deleted from the index section 24 of the ISAM file 20.

In step 13, data is fetched from the address indicated by the index.

In step 14, a determination is made as to whether or not the address from which the data was fetched is the next address after the end of the free area indicated by the end pointer 26B. If the address is the next address after the free area, the flow proceeds to step 15 (Yes). If the address is not the next address after the end of the free area, the processing terminates (No).

Figure 5:
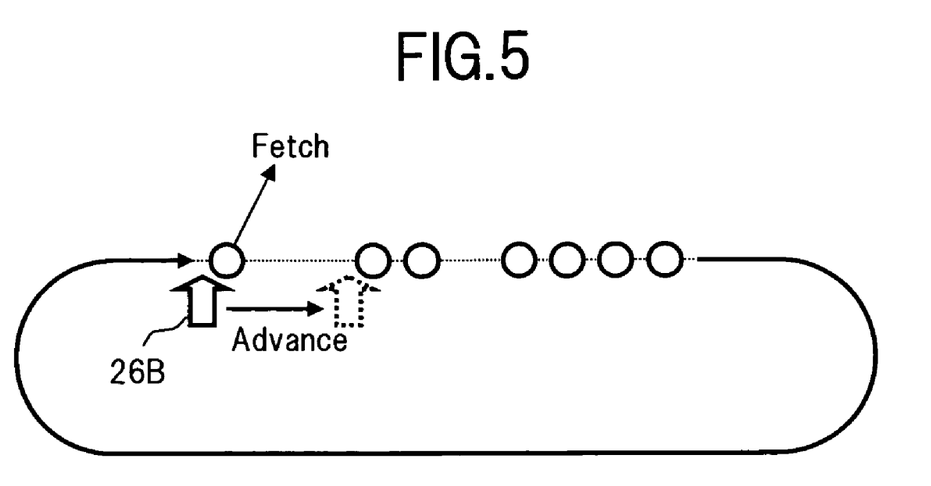
FIG. 5 is an explanatory drawing showing a method of updating an end pointer.

In step 15, the end pointer 26B is advanced to the point immediately before the nearest area which is in use. That is to say, because the data in the data storage section 22 of the ISAM file 20 may be stored in a "fragmented" state as shown in FIG. 5, the end pointer 26B is advanced to the end position of the stored unprocessed data.

According to this processing, when fetching data from the ISAM file 20, data can be fetched at high speed by fetching data directly from the address indicated by the index without going through a buffer. Furthermore, because after fetching the data, the end pointer 26B, which indicates the end of the free area is updated as necessary, the free area can be increased.

Figure 6:
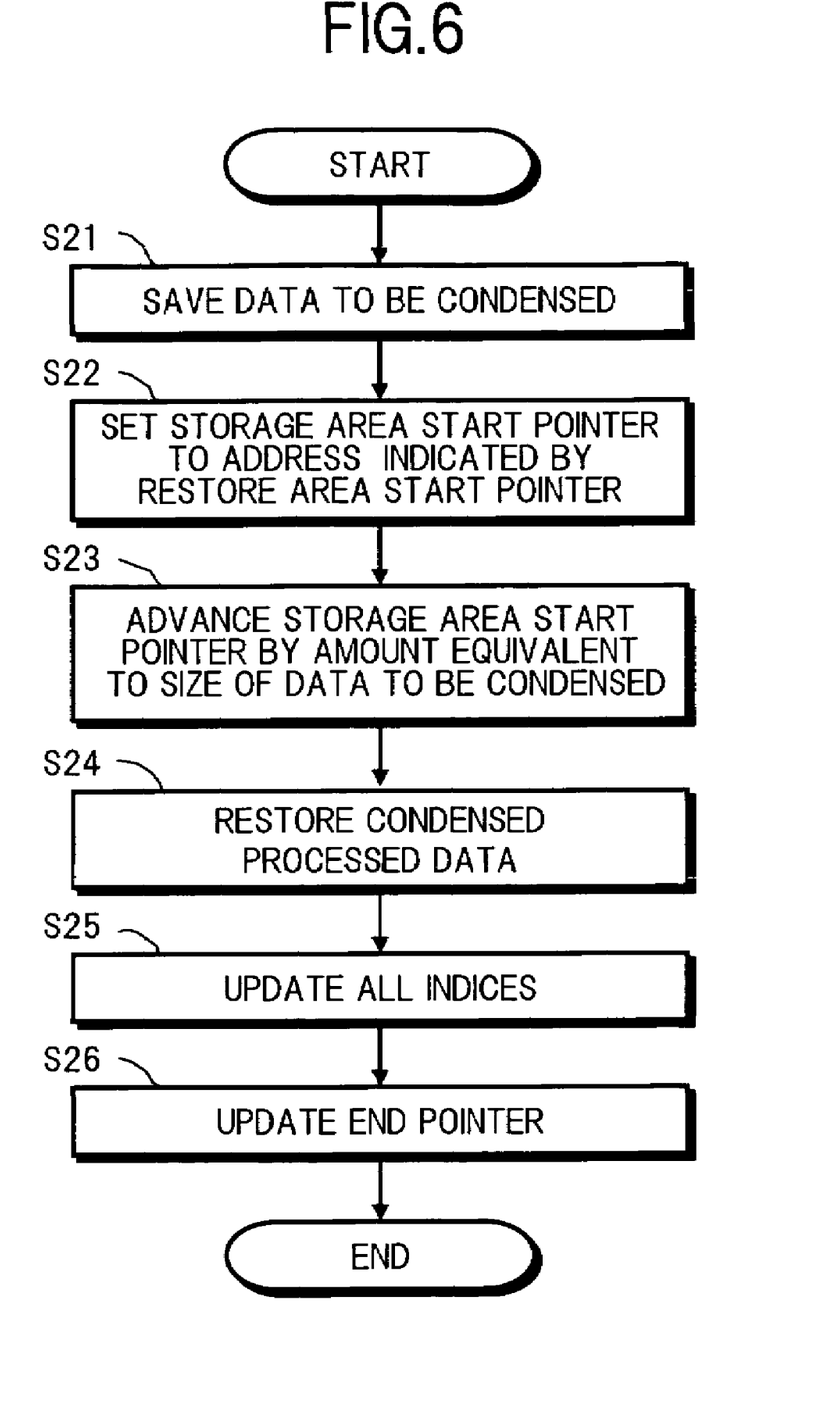
FIG. 6 is a flowchart showing condense processing.

FIG. 6 shows condense processing executed in cooperation by the ISAM access section 30 and the condense processing section 40. Here, in the condense processing, a restore area start pointer 26C which indicates the address where the condense processed data is to be restored, is used in addition to the storage area start pointer 26A and the end pointer 26B. The condense processing shown in this figure respectively realizes; a condense processing function, a condense processing device, and a condense processing step.

In step 21, the data to be condensed is saved from the data storage section 22 of the ISAM file 20 to a save area. At this time, the size of the data to be condensed is calculated by adding up the sizes of each piece of saved data one by one. Here, a typical temporary file or the like may be used as the save area. In the case of asynchronous communication where data is required to be guaranteed, a recoverable file is used simultaneously with the ISAM file 20.

Figure 7A:
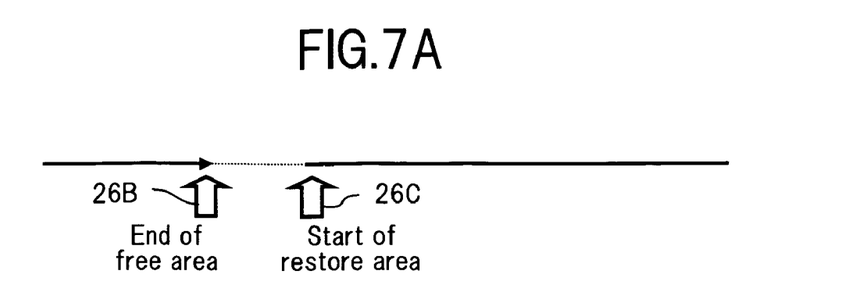
FIG. 7A through FIG. 7D are explanatory views of a pointer update method, respectively, illustrating how addresses indicated by the pointers change during condense processing.

In step 22, in order to restore the data which has undergone condense processing from the start of the storage area as indicated by the storage area start pointer 26A, as shown in FIG. 7A, the restore area start pointer 26C is set to the address indicated by the storage area start pointer 26A.

Figure 7B:
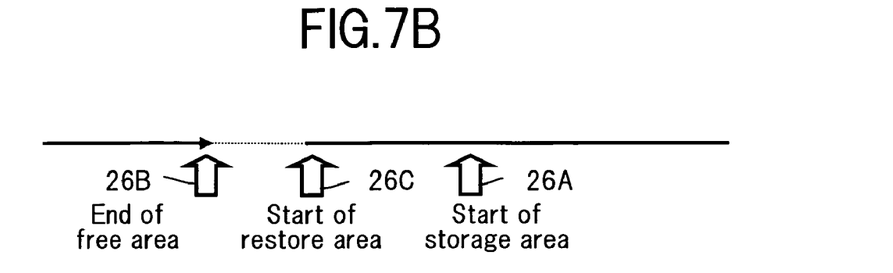

In step 23, as shown in FIG. 7B, the storage area start pointer 26A is advanced by an amount equivalent to the size of the data to be condensed.

Figure 7C:
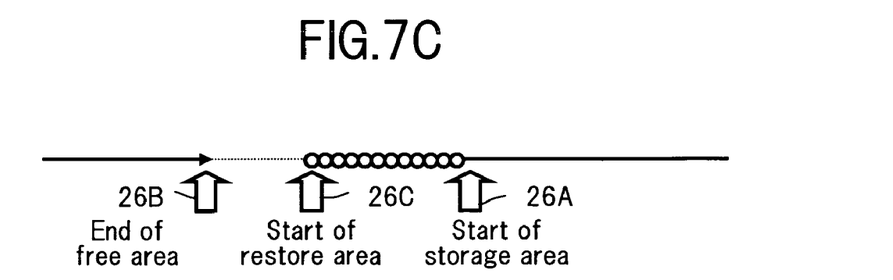

In step 24, as shown in FIG. 7C, the condense processed data is restored by storing the data which has undergone condense processing, in a contiguous manner from the address indicated by the restore area start pointer 26C.

In step 25, because the data storage address has changed, all indices registered in the index sections 24 of the ISAM file 20 are updated.

Figure 7D:
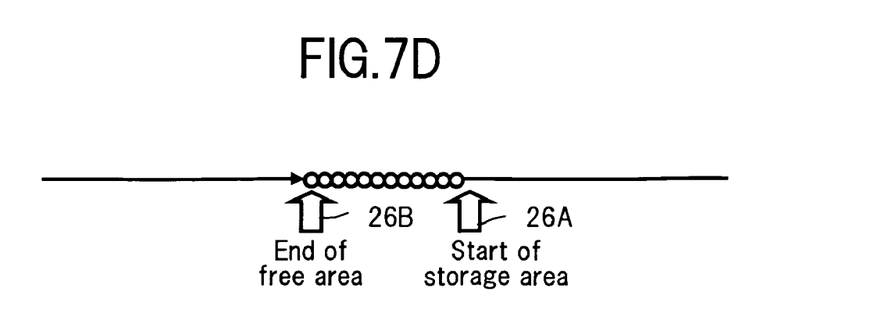

In step 26, as shown in FIG. 7D, the end pointer 26B is advanced to the address indicated by the restore area start pointer 26C and thus updated.

It is possible to replace the processing in step 22 and step 23 with processing which sets the restore area start pointer 26C to an address which precedes the address indicated by the storage area start pointer 26A by an amount equivalent to the size of the data to be condensed.

Figure 8:
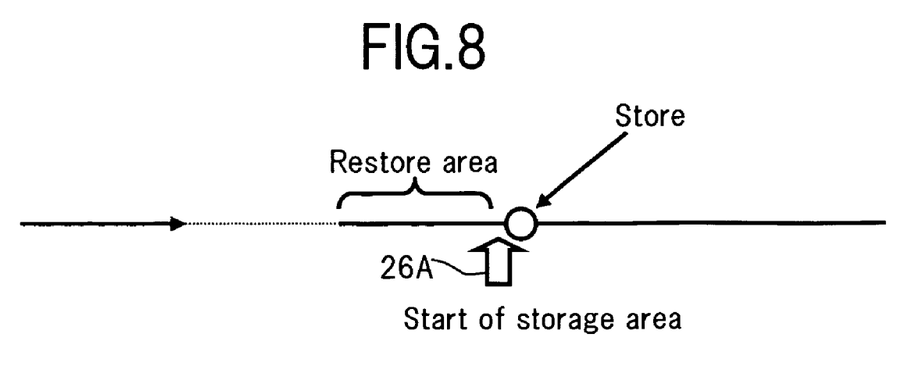
FIG. 8 is an explanatory view of a data storage method during the condense processing.

According to this processing, because data stored in a so-called "fragmented" fashion is saved temporarily to a save area and then stored in a contiguous area from the start of the free area, the free area can be increased. If at this time an application issues a data storage request, the data storage processing shown in FIG. 3 is executed, and as shown in FIG. 8, the data is stored in the area which follows the restore area for the condense processed data, that is to say, the data is stored in the address indicated by the storage area start pointer 26A. Accordingly, data storage by an application is possible even during the condense processing, and for example 24-hour operation of core business systems which use asynchronous communication is possible.

INDUSTRIAL APPLICABILITY

As described above, the asynchronous communication technique according to the present invention enables data storage by an application even during condense processing, and is therefore extremely useful.

I claim:

1. A computer readable memory recording an asynchronous communication program comprising:
   a data storage function for, in an asynchronous communication that uses as a queue an Indexed Sequential Access Method file in which data is stored and fetched directly while cyclically using a data storage area by the use of pointers that indicate a start and an end of a free area and in which a data storage order is guaranteed by an index which indicates data storage addresses, when a data storage request with respect to said Indexed Sequential Access Method file is issued, storing data at an address indicated by a pointer which indicates the start of said free area, and then updating the pointer which indicates the start of said free area;
   a data fetch function for, when a data fetch request with respect to said Indexed Sequential Access Method file is issued, fetching data from a data storage address indicated by an oldest index, then deleting the oldest index, and as necessary updating a pointer which indicates the end of said free area; and
   a condense processing function for, when a condense request with respect to said Indexed Sequential Access Method file is issued, temporarily saving data to be condensed as saved data from said data storage area to a save area, condensing the saved data as condense processed data and calculating the size of the condense processed data, setting a pointer which indicates a start of an area to which the condense processed data is to be restored to an address indicated by the pointer which indicates the start of the free area, and advancing the pointer which indicates the start of the free area by an amount equivalent to the size of the data storage area which is required to restore the condense processed data, then restoring the condense processed data to a contiguous area starting from an address indicated by the pointer which indicates the start of the area to which the condense processed data is to be restored, thereby storing new data which is received during condense processing to the free area which follows the area to which the condense processed data is restored.

2. The computer readable memory according to claim 1, wherein in the asynchronous communication program, said condense processing function calculates a size of a data storage area required to restore the condense processed data, when said saved data is saved temporarily to the save area from said data storage area.

3. The computer readable memory according to claim 1, wherein in the asynchronous communication program, said data fetch function, when deleting the index, if said index indicates an address which follows the end of the free area, updates the pointer which indicates the end of said free area.

4. The computer readable memory according to claim 3, wherein in the asynchronous communication program, said data fetch function, when updating the pointer which indicates the end of said free area, advances said pointer which indicates the end of said free area to a point immediately before the nearest area which is in use.

5. An asynchronous communication apparatus comprising:
   a data storage device which, in an asynchronous communication that uses as a queue an Indexed Sequential Access Method file in which data is stored and fetched directly while cyclically using a data storage area by the use of pointers that indicate a start and an end of a free area and in which a data storage order is guaranteed by an index which indicates data storage addresses, when a data storage request with respect to said Indexed Sequential Access Method file is issued, stores data at an address indicated by a pointer which indicates the start of said free area, and then updates the pointer which indicates the start of said free area;
   a data fetch device which, when a data fetch request with respect to said Indexed Sequential Access Method file is issued, fetches data from a data storage address indicated by an oldest index, then deletes said oldest index, and as necessary updates a pointer which indicates the end of said free area; and
   a condense processing device which, when a condense request with respect to said Indexed Sequential Access Method file is issued, temporarily saves data to be condensed as saved data from said data storage area to a save area, condenses the saved data as condense processed data and calculates the size of the condense processed data, sets a pointer which indicates a start of an area to which the condense processed data is to be restored to an address indicated by the pointer which indicates the start of the free area, and advances the pointer which indicates the start of the free area by an amount equivalent to the size of the data storage area which is required to restore the condense processed data, then restores the condense processed data to a contiguous area starting from an address indicated by the pointer which indicates the start of the area to which the condense processed data is to be restored, thereby storing new data which is received during condense processing to the free area which follows the area to which the condense processed data is restored.

6. A method for executing an asynchronous communication, comprising:
   a data storage step for, in an asynchronous communication that uses as a queue an Indexed Sequential Access Method file in which data is stored and fetched directly while cyclically using a data storage area by the use of pointers that indicate a start and an end of a free area and in which a data storage order is guaranteed by an index which indicates data storage addresses, when a data storage request with respect to said Indexed Sequential Access Method file is issued, storing data at an address indicated by a pointer which indicates the start of said free area, and then updating the pointer which indicates the start of said free area;

a data fetch step for, when a data fetch request with respect to said Indexed Sequential Access Method file is issued, fetching data from a data storage address indicated by an oldest index, then deleting the oldest index, and as necessary updating a pointer which indicates the end of said free area; and a condense processing step for, when a condense request with respect to said Indexed Sequential Access Method file is issued, temporarily saving data to be condensed as saved data from said data storage area to a save area, condensing the saved data as condense processed data and calculating the size of the condense processed data, setting a pointer which indicates a start of an area to which the condense processed data is to be restored to an address indicated by the pointer which indicates the start of the free area, and advancing the pointer which indicates the start of the free area by an amount equivalent to the size of the data storage area which is required to restore the condense processed data, then restoring the condense processed data to a contiguous area starting from an address indicated by the pointer which indicates the start of the area to which the condense processed data is to be restored, thereby storing new data which is received during condense processing to the free area which follows the area to which the condense processed data is restored.

7. A computer readable memory recording an asynchronous communication program comprising:

a data storage function for, in an asynchronous communication that uses as a queue an Indexed Sequential Access Method file in which data is stored and fetched directly while cyclically using a data storage area by the use of pointers that indicate a start and an end of a free area and in which a data storage order is guaranteed by an index which indicates data storage addresses, when a data storage request with respect to said Indexed Sequential Access Method file is issued, storing data at an address indicated by a pointer which indicates the start of said free area, and then updating the pointer which indicates the start of said free area;

a data fetch function for, when a data fetch request with respect to said Indexed Sequential Access Method file is issued, fetching data from a data storage address indicated by an oldest index, then deleting the oldest index, and as necessary updating a pointer which indicates the end of said free area; and a condense processing function for, when a condense request with respect to said Indexed Sequential Access Method file is issued, temporarily saving data to be condensed as saved data from said data storage area to a save area, condensing the saved data as condense processed data and calculating the size of the condense processed data, setting a pointer which indicates a start of an area to which the condense processed data is to be restored to an address that precedes an address indicated by the pointer which indicates the start of the free area by an amount equivalent to the size of the data storage area which is required to restore the condense processed data, then restoring the condense processed data to a contiguous area starting from an address indicated by the pointer which indicates the start of the area to which the condense processed data is to be restored, thereby storing new data which is received during condense processing to the free area which follows the area to which the condense processed data is restored.

8. The computer readable memory according to claim 7, wherein in the asynchronous communication program, said condense processing function calculates a size of a data storage area required to restore the condense processed data, when said saved data is saved temporarily to the save area from said data storage area.

9. The computer readable memory according to claim 7, wherein in the asynchronous communication program, said data fetch function, when deleting the index, if said index indicates an address which follows the end of the free area, updates the pointer which indicates the end of said free area.

10. The computer readable memory according to claim 9, wherein in the asynchronous communication program, said data fetch function, when updating the pointer which indicates the end of said free area, advances said pointer which indicates the end of said free area to a point immediately before the nearest area which is in use.

11. An asynchronous communication apparatus comprising:

a data storage device which, in an asynchronous communication that uses as a queue an Indexed Sequential Access Method file in which data is stored and fetched directly while cyclically using a data storage area by the use of pointers that indicate a start and an end of a free area and in which a data storage order is guaranteed by an index which indicates data storage addresses, when a data storage request with respect to said Indexed Sequential Access Method file is issued, stores data at an address indicated by a pointer which indicates the start of said free area, and then updates the pointer which indicates the start of said free area;

a data fetch device which, when a data fetch request with respect to said Indexed Sequential Access Method file is issued, fetches data from a data storage address indicated by an oldest index, then deletes said oldest index, and as necessary updates a pointer which indicates the end of said free area; and a condense processing device which, when a condense request with respect to said Indexed Sequential Access Method file is issued, temporarily saves data to be condensed as saved data from said data storage area to a save area, condenses the saved data as condense processed data and calculates the size of the condense processed data, sets a pointer which indicates a start of an area to which the condense processed data is to be restored to an address that precedes an address indicated by the pointer which indicates the start of the free area by an amount equivalent to the size of the data storage area which is required to restore the condense processed data, then restores the condense processed data to a contiguous area starting from an address indicated by the pointer which indicates the start of the area to which the condense processed data is to be restored, thereby storing new data which is received during condense processing to the free area which follows the area to which the condense processed data is restored.

12. A method for executing an asynchronous communication, comprising:

a data storage step for, in an asynchronous communication that uses as a queue an Indexed Sequential Access Method file in which data is stored and fetched directly while cyclically using a data storage area by the use of pointers that indicate a start and an end of a free area and in which a data storage order is guaranteed by an index which indicates data storage addresses, when a data storage request with respect to said Indexed Sequential Access Method file is issued, storing data at an address indicated by a pointer which indicates the start of said free area, and then updating the pointer which indicates the start of said free area;

a data fetch step for, when a data fetch request with respect to said Indexed Sequential Access Method file is issued, fetching data from a data storage address indicated by an oldest index, then deleting the oldest index, and as necessary updating a pointer which indicates the end of said free area; and a condense processing step for, when a condense request with respect to said Indexed Sequential Access Method file is issued, temporarily saving data to be condensed as saved data from said data storage area to a save area, condensing the saved data as condense processed data and calculating the size of the condense processed data, setting a pointer which indicates a start of an area to which the condense processed data is to be restored to an address that precedes an address indicated by the pointer which indicates the start of the free area by an amount equivalent to the size of the data storage area which is required to restore the condense processed data, then restoring the condense processed data to a contiguous area starting from an address indicated by the pointer which indicates the start of the area to which the condense processed data is to be restored, thereby storing new data which is received during condense processing to the free area which follows the area to which the condense processed data is restored.

* * * * *